United States Patent
Badge et al.

(10) Patent No.: US 10,757,050 B2
(45) Date of Patent: Aug. 25, 2020

(54) SYSTEM AND METHOD FOR TOPIC BASED SEGREGATION IN INSTANT MESSAGING

(71) Applicant: Avaya Inc., Santa Clara, CA (US)

(72) Inventors: Gaurav Badge, Pune (IN); Ramanujan Kashi, Bangalore (IN); Thirunavukkarasu Arjunan, Bangalore (IN)

(73) Assignee: Avaya Inc., Santa Clara, CA (US)

( * ) Notice: Subject to any disclaimer, the term of this patent is extended or adjusted under 35 U.S.C. 154(b) by 142 days.

(21) Appl. No.: 16/148,609

(22) Filed: Oct. 1, 2018

(65) Prior Publication Data
US 2019/0036854 A1 Jan. 31, 2019

Related U.S. Application Data

(62) Division of application No. 14/622,668, filed on Feb. 13, 2015, now Pat. No. 10,110,523.

(51) Int. Cl.
*H04L 12/58* (2006.01)

(52) U.S. Cl.
CPC ................ *H04L 51/046* (2013.01)

(58) Field of Classification Search
CPC .................... H04L 51/04; H04L 51/046
See application file for complete search history.

(56) References Cited

U.S. PATENT DOCUMENTS

| | | | |
|---|---|---|---|
| 5,597,312 A * | 1/1997 | Bloom | G09B 7/04 434/362 |
| 6,557,027 B1 | 4/2003 | Cragun | |
| 6,747,970 B1 | 6/2004 | Lamb et al. | |
| 8,006,191 B1 * | 8/2011 | Anderson | G06Q 10/107 715/751 |
| 8,060,565 B1 | 11/2011 | Swartz | |
| 8,843,835 B1 * | 9/2014 | Busey | H04L 12/1813 715/739 |
| 9,195,739 B2 | 11/2015 | Imig et al. | |
| 1,011,052 A1 | 10/2018 | Badge et al. | |

(Continued)

FOREIGN PATENT DOCUMENTS

| | | |
|---|---|---|
| CN | 101075983 | 11/2007 |
| CN | 101094195 | 12/2007 |

(Continued)

OTHER PUBLICATIONS

Official Action with English Translation for China Patent Application No. 201610206034.5, dated Aug. 26, 2019 13 pages.

(Continued)

*Primary Examiner* — Esther B. Henderson
(74) *Attorney, Agent, or Firm* — Sheridan Ross P.C.

(57) ABSTRACT

In order to be able to discuss multiple topics separately in an electronic chat session, a request to discuss one or more topics in the electronic chat session is detected. In response to detecting the request to discuss the one or more topics in the electronic chat session, a sub-chat session for each of the one or more topics is created within the electronic chat session. Information associated with the sub-chat sessions is sent to the participants of the electronic chat session. This allows each participant to chat separately on each topic via the separate sub-chat sessions; thus creating an individual transcript for each topic.

20 Claims, 6 Drawing Sheets

(56) References Cited

U.S. PATENT DOCUMENTS

| | | | |
|---|---|---|---|
| 2003/0126027 A1* | 7/2003 | Nelson | G06Q 30/02 |
| | | | 705/26.1 |
| 2004/0078435 A1 | 4/2004 | Dunbar et al. | |
| 2005/0149622 A1 | 7/2005 | Kirkland et al. | |
| 2005/0262199 A1* | 11/2005 | Chen | G06Q 10/107 |
| | | | 709/204 |
| 2006/0235932 A1 | 10/2006 | Celi, Jr. et al. | |
| 2007/0079249 A1 | 4/2007 | Pall et al. | |
| 2007/0288560 A1 | 12/2007 | Bou-Ghannam et al. | |
| 2009/0307319 A1 | 12/2009 | Dholakia et al. | |
| 2014/0222429 A1 | 8/2014 | DeLand | |
| 2015/0288633 A1 | 10/2015 | Ogundokun et al. | |

FOREIGN PATENT DOCUMENTS

| | | |
|---|---|---|
| CN | 101345718 | 1/2009 |
| CN | 104113470 | 10/2014 |
| JP | 2000-267976 | 9/2000 |
| JP | 2004-272568 | 9/2004 |
| JP | 2006-227711 | 8/2006 |
| JP | 2010-152813 | 7/2010 |
| JP | 2011-41246 | 2/2011 |

OTHER PUBLICATIONS

Official Action with English Translation for China Patent Application No. 201610206034.5, dated Aug. 27, 2018 23 pages.
Official Action for United Kingdom Patent Application No. GB1602575.1, dated Sep. 21, 2016 7 pages.
Intention to Grant for United Kingdom Patent Application No. GB1602575.1, dated Mar. 3, 2017 2 pages.
English Translation of Official Action for Japan Patent Application No. 2016-024461, dated Jun. 6, 2017 4 pages.
Official Action with English Translation for Japan Patent Application No. 2016-024461, dated Nov. 14, 2017 4 pages.
Decision to Grant for Japan Patent Application No. 2016/024461, dated May 8, 2018 3 pages.
Official Action for U.S. Appl. No. 14/622,668, dated Dec. 22, 2016 9 pages.
Official Action for U.S. Appl. No. 14/622,668, dated May 22, 2017 13 pages.
Official Action for U.S. Appl. No. 14/622,668, dated Dec. 8, 2017 11 pages.
Notice of Allowance for U.S. Appl. No. 14/622,668, dated Jun. 6, 2018 5 pages.
Official Action with English Translation for China Patent Application No. 201610206034.5, dated Mar. 29, 2019 18 pages.

* cited by examiner

SYSTEM AND METHOD FOR TOPIC BASED SEGREGATION IN INSTANT MESSAGING

CROSS REFERENCE TO RELATED APPLICATION

The present application is a divisional of U.S. patent application Ser. No. 14/622,668, filed Feb. 13, 2015, entitled "SYSTEM AND METHOD FOR TOPIC BASED SEGREGATION IN INSTANT MESSAGING", which is incorporated herein by this reference in its entirety.

TECHNICAL FIELD

The systems and methods disclosed herein relate to Instant Messaging (IM) systems and in particular to configurable IM systems.

BACKGROUND

Current IM solutions offer one-to-one and group chat features. In a typical group chat, different topics are discussed. As a result, conversations on the different topics become intermixed within the IM session. This makes it difficult to follow a transcript of the IM session because a particular topic may be fragmented throughout the IM session. If a person wants to review a specific topic in the IM session, the person has to search through the whole transcript and pick out specific conversations on the topic of interest. This can be cumbersome if the transcript is long and there are numerous different topics discussed in the IM session.

SUMMARY

Systems and methods are provided to solve these and other problems and disadvantages of the prior art. To discuss multiple topics separately in an electronic chat session, a request to discuss one or more topics in the electronic chat session is detected. In response to detecting the request to discuss the one or more topics in the electronic chat session, a sub-chat session for each of the one or more topics is created within the electronic chat session. Information associated with each sub-chat session is sent to the participants of the electronic chat session. This allows each participant to chat separately on each topic via the separate sub-chat sessions; thus, creating an individual transcript for each topic.

DETAILED DESCRIPTION

Figure 1:
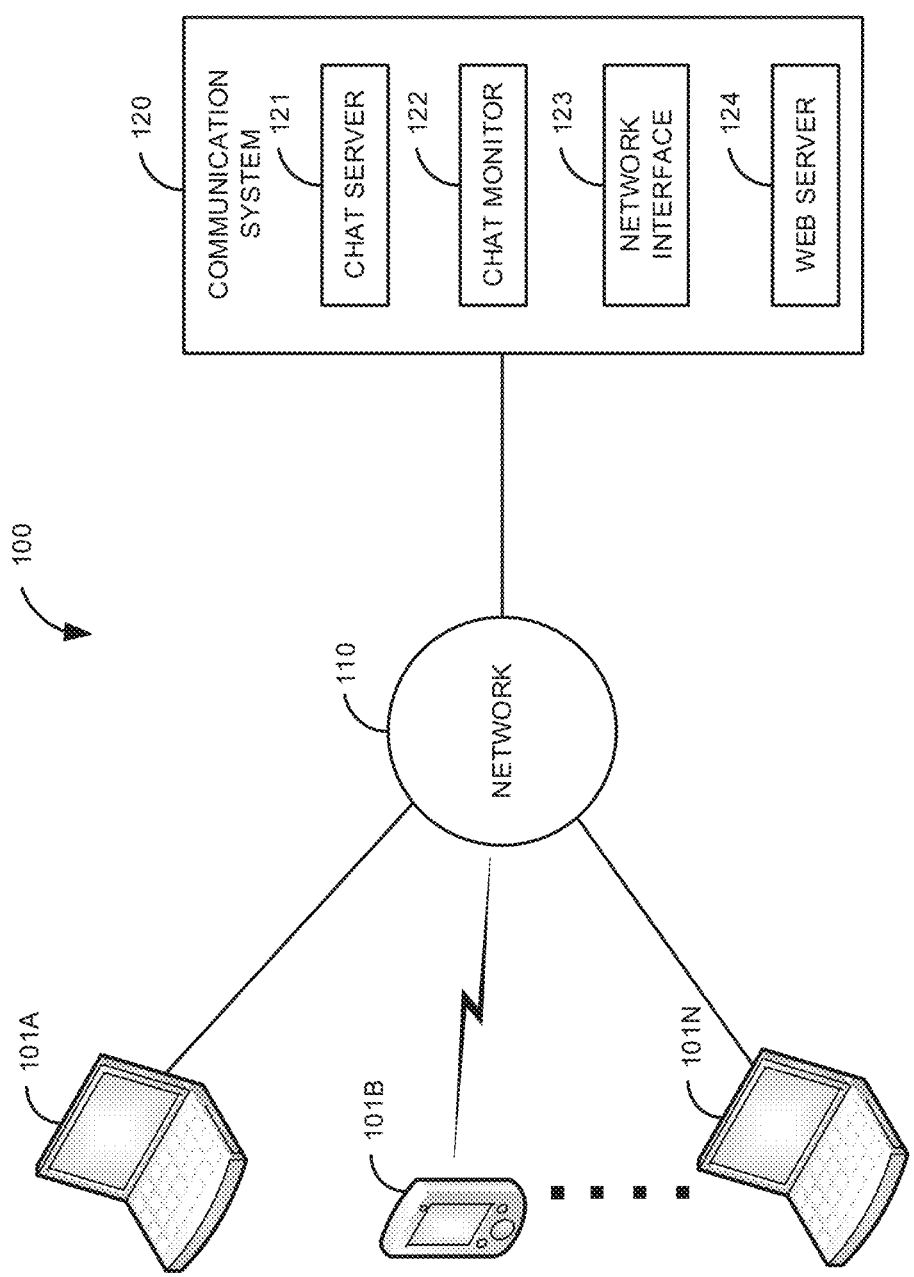
FIG. 1 is a block diagram of a first illustrative system for managing a chat session.

FIG. 1 is a block diagram of a first illustrative system 100 for managing a chat session. The first illustrative system 100 comprises communication devices 101A-101N, a network 110, and a communication system 120.

The communication device 101 can be or may include any device that can communicate on the network 110, such as a Personal Computer (PC), a telephone, a video system, a cellular telephone, a Personal Digital Assistant (PDA), a tablet device, a notebook device, a smart phone, and/or the like. As shown in FIG. 1, any number of communication devices 101A-101N may be connected to the network 110, including only a single communication device 101. In addition, the communication device 101 may be directly connected to the communication system 120.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), Instant Messaging (IM) protocols, text messaging protocols, Hypertext Transfer Protocol (HTTP), and/or the like. Thus, the network 110 is an electronic communication network that allows for sending of messages via packets and/or circuit switched communications.

The communication system 120 can be or may include any hardware/software that can manage communications on the network 110, such as, a Private Branch Exchange (PBX), a router, an IM server, an IM router, a chat server, a text messaging server, and/or the like. The communication system 120 further comprises a chat server 121, a chat monitor 122, a network interface 123, and a web server 124.

The chat server 121 can be or may include any software/hardware that can manage chat communications on the network 110, such as an IM server, a text messaging server, and/or the like. The chat server 121 can manage chat communications between the communication devices 101A-101N. A chat communication can be or may include an IM communication, a text communication, and/or the like. In one embodiment, the chat server 121 may be on a communication device 101 or distributed between the communication system 120 and a communication device 101.

The chat monitor 122 can be or may include any hardware/software that can monitor communications in a chat session. For example, the chat monitor 122 can monitor a chat session for keywords. In one embodiment, the chat monitor may 122 be on a communication device 101 or distributed between the communication system 120 and the communication device 101.

The network interface 123 is a hardware interface for communicating on the network 110, such as an Ethernet interface, a fiber optic interface, a wireless interface, an ISDN interface, and/or the like. In one embodiment, the network interface may be in a communication device 101. For example, the chat server 121, the chat monitor 122, the network interface 123, and optionally the web server 124 may all reside in the communication device 101. In this embodiment, the communication device 101 works in a peer-to-peer configuration.

The web server 124 can be or may include any hardware/software that can provide web services to the communication devices 101A-101N. For example, the web server 124 can provide an electronic chat session between the communication devices 101A-101N. In one embodiment, the web server 124 is on a separate server from the communication system 120.

Figure 2:
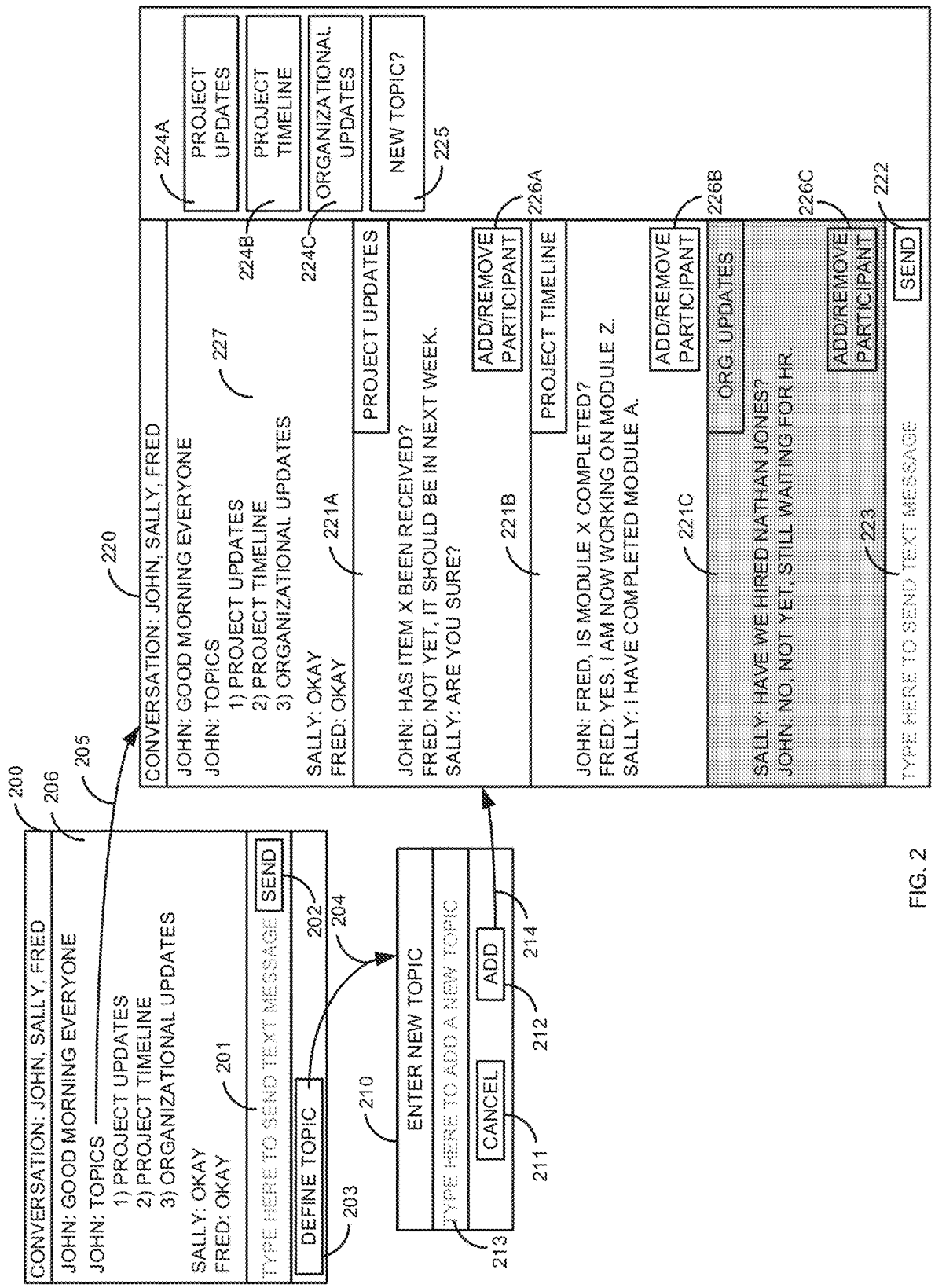
FIG. 2 is a diagram for creating one or more sub-chat sessions from a chat session.

FIG. 2 is a diagram for creating one or more sub-chat sessions from a chat session. FIG. 2 comprises windows of a user interface that are used to manage sub-chat sessions. FIG. 2 comprises a chat session window 200, a new topic window 210, and a sub-chat session window 220. In one embodiment, the chat session window 200, the new topic window 210, and the sub-chat session window 220 are web pages (e.g., one or more html documents) sent by the web server 124 to one or more of the communication devices 101A-101N. Alternatively, the chat session window 200, the new topic window 210, and the sub-chat session window 220 are windows created by a distributed application that resides on the communication device 101 and/or other components of the communication system 120.

The chat session window 200 comprises a text message send box 201, a text message send button 202, a define topic button 203, and a chat message area 206. The new topic window 210 comprises a cancel button 211, an add button 212, and an enter topic message box 213. The sub-chat session window 220 comprises sub-chat message areas 221A-221C, a text message send button 222, a text message send box 223, topic selection buttons 224A-224C, a new topic button 225, and a chat message area 227. The topic selection buttons 224A-224C are based on defined topics, in this example, for the topics: 1) project updates, 2) project timeline, and 3) organizational updates. The sub-chat message areas 221A-221C further comprises add/remove participant buttons 226A-226C.

The windows 200, 210, and 220 of FIG. 2 are representative of one illustrative embodiment of a display given to an administrator or moderator of the electronic chat session at one of the communication devices 101. In this example, the view of FIG. 2 is from the view of the participant John, who is the moderator of the electronic chat session. One of skill in the art would recognize that the other participants in the electronic chat session (Sally and Fred) would see windows similar to windows 200 and 220 without administrative buttons, such as, the define topic button 203, the add/remove participants buttons 226A-226C, and the new topic button 225. In another embodiment, all the participants may have similar views as shown in FIG. 2. In yet another embodiment, the other participants (Sally and Fred) may have only a sub-set of features, such as, Sally and Fred may be able to add or remove participants, but may not be able to add new topics for discussion.

Figure 3:
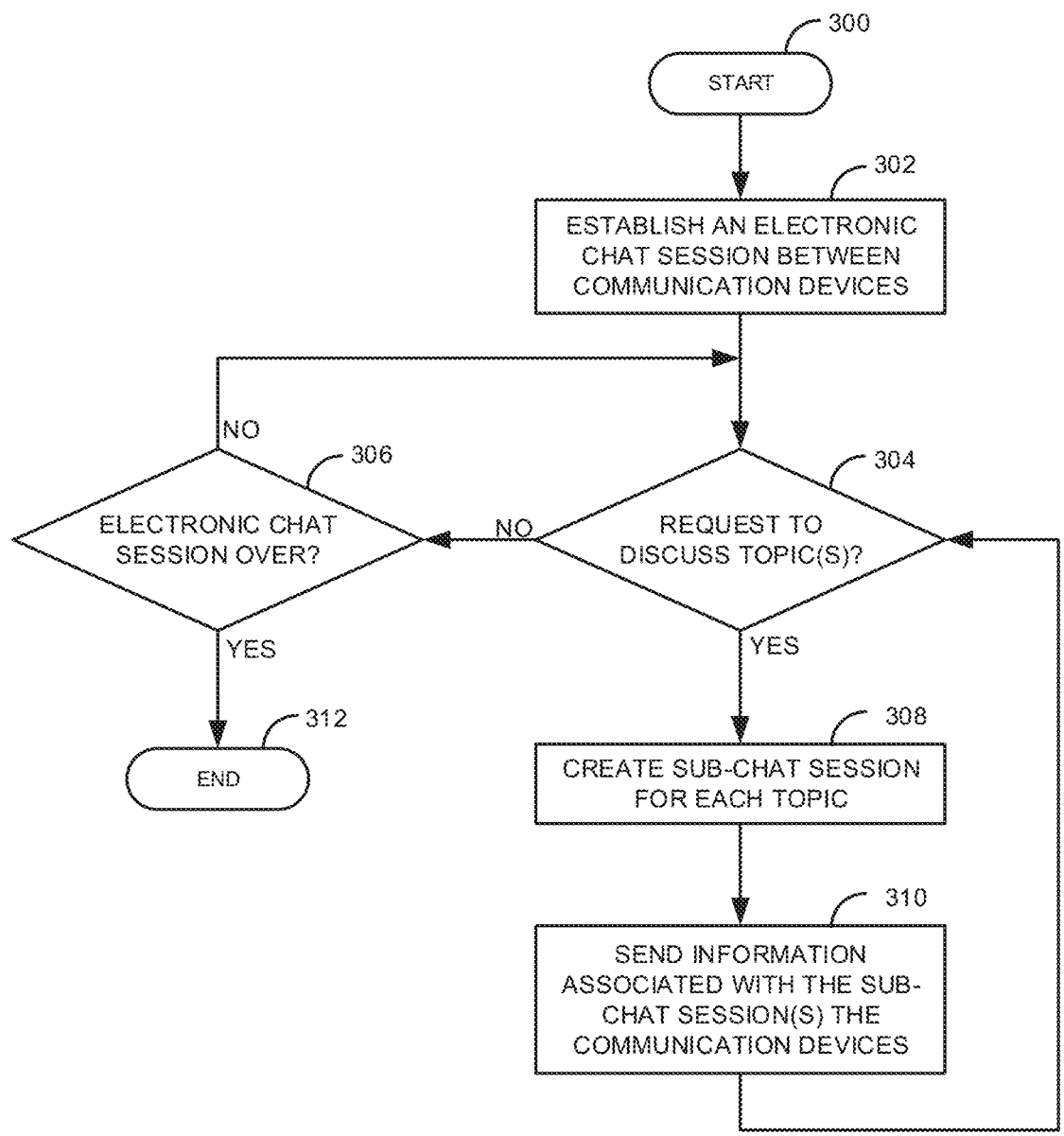
FIG. 3 is a flow diagram of a process for managing a chat session.

The process starts when an electronic chat session is established, by the chat server 121, via the network 110, between two or more (a plurality) participants at the communication devices 101A-101N. This brings up the chat session window 200. In this exemplary embodiment, the chat session window 200 displays an electronic chat session between three participants: 1) John (who is the moderator), 2) Sally, and 3) Fred. The electronic chat session is displayed in the chat message area 206. The electronic chat session displayed in FIG. 3 is a regular chat session window similar to chat session windows previously known in the art (minus the define topic button 203). John enters messages for the electronic chat session via the text message send box 201 and clicks on the text message send button 202 to send a chat to the other participants.

The chat monitor 122 detects a request to discuss a topic in the electronic chat session. The chat monitor 122 can detect a request to discuss a topic(s) in the electronic chat session in various ways. For example, the chat monitor 122 can detect a keyword or phrase in the electronic chat session. In FIG. 3, the chat monitor can detect the word "topic" along with the topics in numeric order as in the chat session window 200. When the chat monitor 122 detects the word "topic" along with the numeric order of topics, the process, in step 205, automatically displays the sub-chat session window 220. The sub-chat session window 220 is automatically displayed based on the defined list of topics in the chat session window 200. In this exemplary embodiment, the topics in the chat session window 200 are: 1) project updates, 2) project timeline, and 3) organizational updates.

Alternatively, the chat monitor 122 can detect a request to discuss the topic in the electronic chat session based on the participant (John the moderator) clicking on a button or menu. In this example, the participant can click on the define topic button 203 in step 204. When the participant clicks on the define topic button 203 in step 204, the new topic window 210 is displayed to the participant. The participant can then enter the topic in the enter topic message box 213 and click on the add button 212 to bring up the sub-chat session window 220 in step 214. The new topic window 210 is one of many ways that would be obvious to one of skill in the art to enter one or more topics. For example, the participant may be able to add multiple topics in the new topic window 210. Alternatively, the participant may cancel defining a topic for the electronic chat session by clicking on the cancel button 211.

In another embodiment, the chat monitor 122 can detect a request to discuss the topic in the electronic chat session based on another participant sending a request in the electronic chat session to discuss a topic(s). For example, the chat monitor 122 can detect a message from another participant based on a keyword in an individual chat from one of the other participants in the electronic chat session. The moderator can then approve the request to discuss the topic(s).

When the chat monitor 122 detects the request to discuss the topic in the electronic chat session, the chat server 121 creates one or more sub-chat sessions based on the topic(s). In this example, the chat monitor 122 creates sub-chat sessions for each topic (three sub-chat sessions). The three sub-chat sessions are shown in the sub-chat session window 220. In this embodiment, the three sub-chat sessions are created using the same participants (John, Sally, and Fred) that were in the electronic chat session. However, in other embodiments, the moderator (John) can determine which of the other participants may be included in the individual ones of the sub-chat sessions. For example, John may exclude Fred from the sub-chat session for organizational updates.

The sub-chat session window 220 shows the original electronic chat session (in chat message area 227) and the three sub-chat sessions for the three topics in the sub-chat message areas 221A-221C. The first sub-chat session for the project updates sub-chat session is displayed in the sub-chat message area 221A. The second sub-chat session for the project timeline sub-chat session is displayed in the sub-chat message area 221B. The third sub-chat session for the organizational updates sub-chat session is displayed in the sub-chat message area 221C.

The participants can select a topic to chat on with other participants in various ways. In this embodiment, the participant can select one of the topic selection buttons 224A-224C to select a particular sub-chat session. Alternatively, the participant may click on one of the sub-chat message areas 221A-221C to select a particular topic to converse with the other participants. In this illustrative example, the participant has selected the organizational updates sub-chat session (indicated by the grey background). To send a chat on the organizational updates sub-chat session (the currently selected sub-chat session), the participant can enter text in the text message send box 223 and click on the text message send button 222.

If a particular participant wants to send a chat on the project updates sub-chat session, the participant can select the topic selection button 224A to select the project updates sub-chat session. The participant can then enter text in the text message send box 223 and click on the text message send button 222 to send a chat for the project updates sub-chat session. Likewise, the participant can select the topic selection button 224B to select the project timeline sub-chat session. The participant can then enter text in the text message send box 223 and click on the text message send button 222 to send a chat for the project timeline sub-chat session.

A new participant can be added to a sub-chat session by clicking on the add/remove participant buttons 226A-226C for each respective sub-chat session. For example, John can add a new participant (Jane) to the project timeline sub-chat session by clicking on the add/remove participant button 226B. John is presented with a window (not shown) that allows John to add Jane to the sub-chat session for the project timeline. Likewise, John could remove a participant in a similar manner from one of the sub-chat sessions.

If the moderator wants to discuss an additional topic, the moderator can select the new topic button 225. Selecting the new topic button 225 brings up a window (similar to the new topic window 210) to add a new sub-chat session to the sub-chat session window 220.

FIG. 3 is a flow diagram for a process for managing a chat session. Illustratively, the communication devices 101A-101N, the communication system 120, the chat server 121, the chat monitor 122, the network interface 123, and the web server 124 are stored-program-controlled entities, such as a computer or processor, which performs the method of FIGS. 3-6 and the processes described herein by executing program instructions stored in a tangible computer readable storage medium, such as a memory or disk. Although the methods described in FIGS. 3-6 are shown in a specific order, one of skill in the art would recognize that the steps in FIGS. 3-6 may be implemented in different orders and/or be implemented in a multi-threaded environment. Moreover, various steps may be omitted or added based on implementation.

The process starts in step 300. The process establishes an electronic chat session between two or more communication devices 101 in step 302. The process determines if a request to discuss a topic in the electronic chat session has been detected in step 304. If a request to discuss the topic in the electronic chat session has not been detected in step 304, the process determines in step 306 if the electronic chat session is over. If the electronic chat session is over in step 306, the process ends in step 312. Otherwise, if the electronic chat session is not over in step 306, the process goes back to step 304.

If the request to discuss one or more topics has been detected in step 304, the process creates a sub-topic session for each topic in step 308. The process sends information associated with the sub-chat sessions to the communication devices 101A-101N. For example, the web server 124 can send the sub-chat session window 220 with the sub-chat sessions to the communication devices 101A-101N. The process goes back to step 304 to see if an additional request to discuss topics (e.g., if the moderator wants to add an additional topic).

Figure 4:
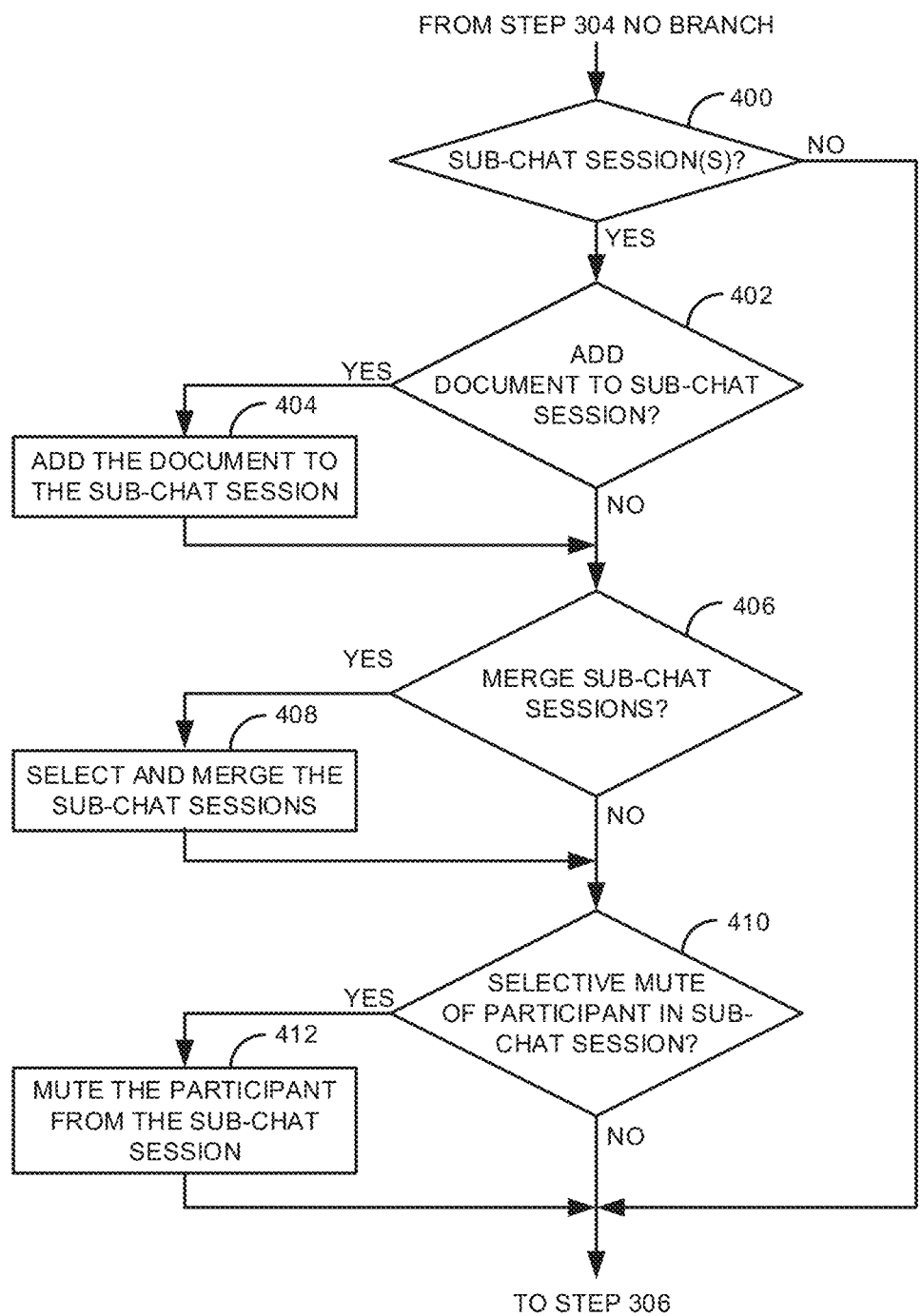
FIG. 4 is a flow diagram of a process for managing different embodiments of a chat session.

FIG. 4 is a flow diagram for a process for managing different embodiments of a chat session. The process of FIG. 4 goes between step 304 (no branch) and step 306 of FIG. 3. After determining that a request to discuss a topic(s) was not received in step 304, the process determines in step 400 if one or more sub-chat sessions have been created. If one or more sub-chat sessions have not been created in step 400, the process goes to step 306.

Otherwise, if a sub-chat session has been created in step 400, the process determines in step 402 if a participant wants to add a document to a sub-chat session. If the participant does not want to add a document to a sub-chat session in step 402, the process goes to step 406. Otherwise, if the participant wants to add a document to the sub-chat session in step 402, the process adds the document to the sub-chat session in step 404 and goes to step 406. The participant can add a document to a sub-chat session based on a button or menu. For example, the sub-chat message areas 221A-221C may have an add document button for the participant to add a document to the individual sub-chat session.

The type of document that can be added to the sub-chat session can be any type of electronic document, such as a text document, a slide presentation, a read-only document, an editable document, a spreadsheet, a photograph, an audio file, a video file, and/or the like. Individual participants may be limited on which types or sizes of documents that can be added to the sub-chat session. For example, a moderator may only allow a specific participant to be able to add spreadsheets to a sub-chat session. In addition, individual participants, based on a defined rule, may or may not be able to add a document to any sub-chat session (or an individual sub-chat session).

The process determines if a participant, such as a moderator, wants to merge two or more sub-chat sessions in step 406. If the participant does not want to merge sub-chat sessions in step 406, the process goes to step 410. Otherwise, if the participant wants to merge sub-chat sessions in step 406, the process allows the participant to select the sub-chat sessions and merge the selected sub-chat session into a single sub-chat session in step 408 and the process goes to step 410. In one embodiment, the selected sub-chat sessions are merged in a serial manner (i.e., one right after the other). Alternatively, the selected sub-chat sessions are merged based on a time of individual messages within the selected sub-chat sessions.

The process determines if a participant, such as the moderator, wants to selectively mute another participant in a sub-chat session in step 410. When a participant is muted, the muted participant will be unable to view any chat messages in the sub-chat session by other participants for a period of time. For example, if John, Sally, and Fred were in a sub-chat session and John muted Sally, Sally would be unable to see any messages sent by John and Fred during the time that Sally was muted. If the process determines that a participant has been selectively muted in step 410, the process mutes the participant from the sub-chat session in step 412 and the process goes to step 306. Otherwise, if the process determines in step 410 that there is not a selective mute request for a participant of the sub-chat session, the process goes to step 306. Although not shown, the process can selectively unmute a participant.

Figure 5:
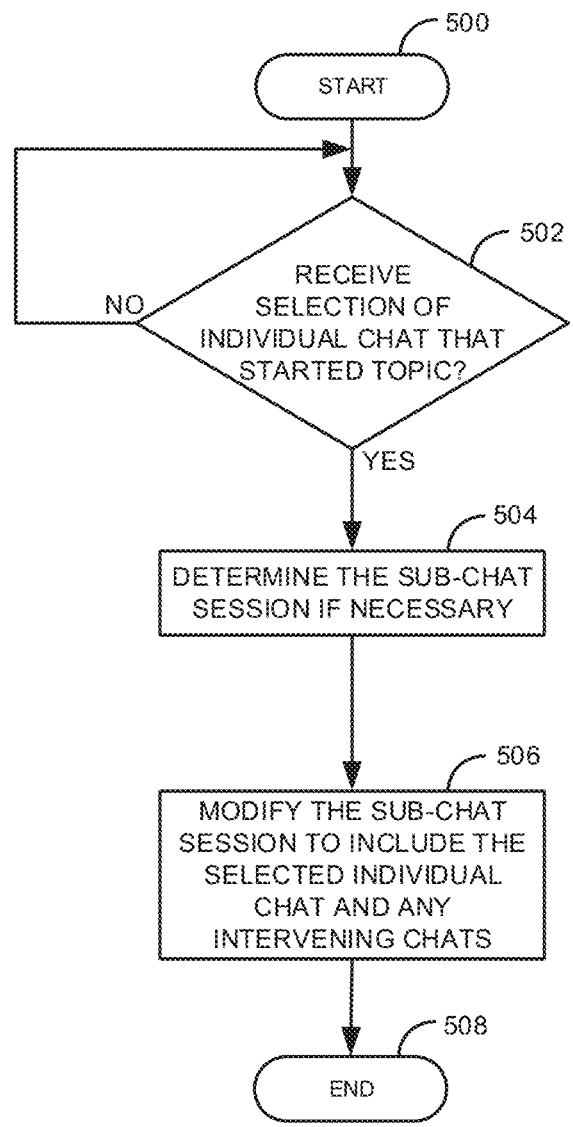
FIG. 5 is a flow diagram of a process for modifying a sub-chat session.

FIG. 5 is a flow diagram for a process for modifying a sub-chat session. The process of FIG. 5 typically occurs after a sub-chat session has been created. However, the process of FIG. 5 may occur as part of the process for creating a sub-chat session. The process starts in step 500. The process determines if a selection of an individual chat has been received in step 502. An individual chat is an individual message sent by one of the participants in the sub-chat session. For example, the moderator (John) of FIG. 2 may select the individual chat "John: Good morning everyone" in the chat session window 200 chat message area 206.

If a selection of an individual chat has not been received in step 502, the process waits at step 502. Otherwise, if a selection of an individual chat has been received in step 502, the process determines which sub-chat session (if necessary) to associate the individual chat with in step 504. For example, if there is only a single sub-chat session, the step of 504 is unnecessary because there is only a single sub-chat session. Step 504 can be based on a window that allows the user to select a particular sub-chat session if there are multiple sub-chat sessions. The process modifies sub-chat session to include the selected individual chat and any intervening chats in step 506. For example, if the moderator John of FIG. 2 selected the individual chat "John: Good morning everyone" to be associated with the chat project updates, the text "John: Good morning everyone, John: Topics, 1) Project Updates, 2) Project Timeline, 3) Organizational Updates, Sally: Okay, Fred: Okay" would be added to the project updates sub-chat session.

By allowing the participant to add text from the chat message area 206 to a sub-chat session overcomes the problem of where a topic was discussed prior to creating the sub-chat session for the topic. For example, if the participants discussed the project timeline in detail before creating the project timeline sub-chat session, a participant can bring in the text from the chat message area into a sub-topic session.

The above process brings in the selected individual chat and any intervening chats. However, in other embodiments, the participant may be able to select specific individual chats to bring into the sub-chat session.

Figure 6:
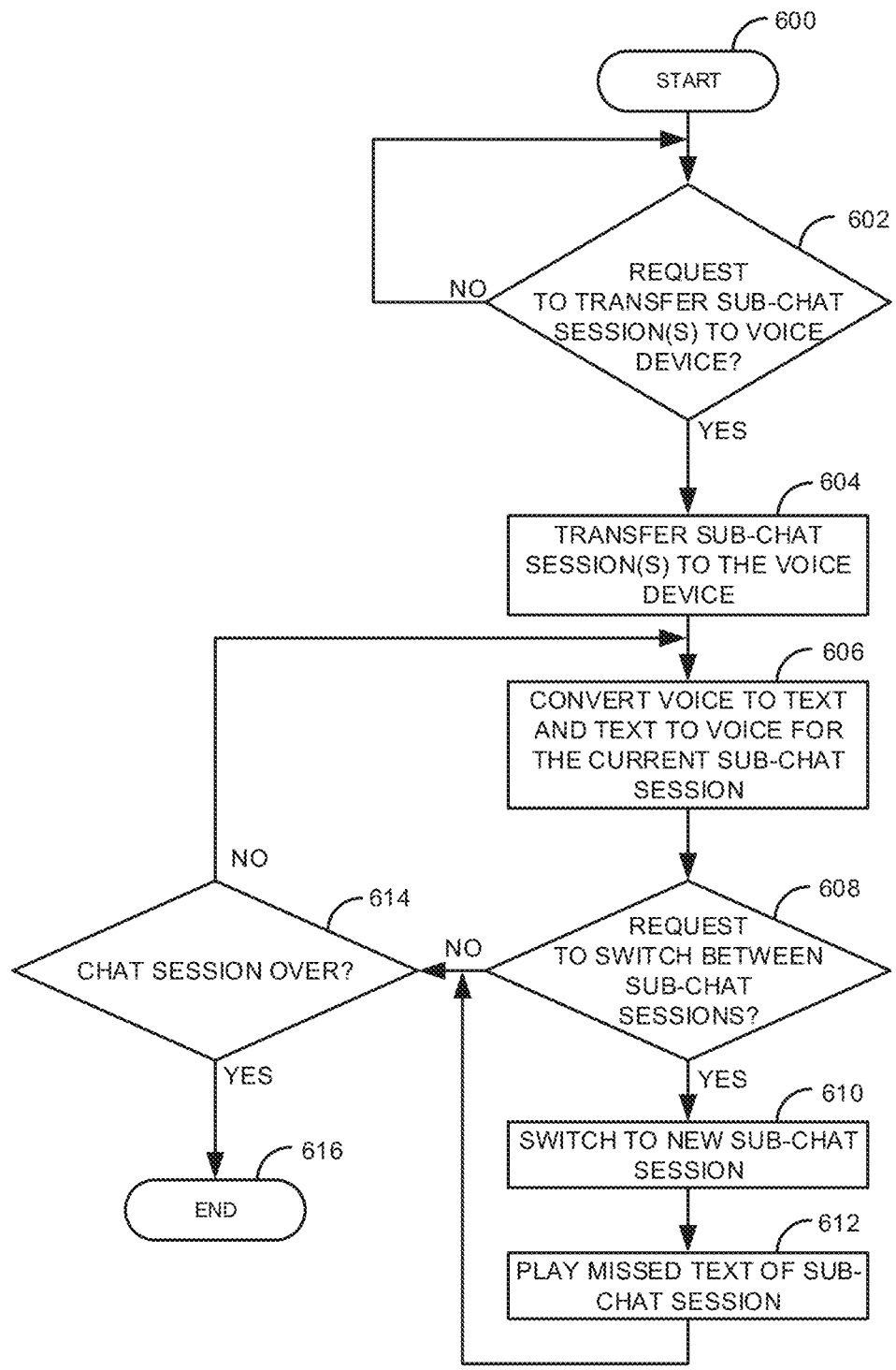
FIG. 6 is a flow diagram of a process for transferring one or more sub-chat sessions to a voice communication device.

FIG. 6 is a flow diagram for a process for transferring one or more sub-chat sessions to a voice communication device. The process starts in step 600. The process determines in step 602 if a participant has requested to transfer a sub-chat session(s) to a voice device, such as a telephone, mobile telephone, a smart phone, and/or the like. The request to transfer the sub-chat session(s) can be based on the user providing a telephone number of the voice device. If the request to transfer the sub-chat session(s) to the voice device has not been received in step 602, the process repeats step 602.

Otherwise, if the process determines that the request to transfer the sub-chat session(s) to the voice device has been received in step 602, the process transfers the sub-chat session(s) to the voice device in step 604. For example, if there are three sub-chat sessions(s) as shown in FIG. 2, the three sub-chat sessions can be transferred as individual voice calls (e.g., using the Session Initiation Protocol). This would create three voice communication sessions, with two being placed on hold and the selected one being active.

The process converts voice to text and text to voice for the current sub-chat session in step 606. For example, if the organizational updates sub-chat session was the currently selected sub-chat session (e.g., as shown in FIG. 2), when the participant speaks, the participant's voice is converted to text messages in the organizational updates sub-chat session. The other participant's chat messages in the organizational updates sub-chat session are converted to voice.

The process determines if a request to switch between sub-chat sessions has been received (if there are multiple sub-chat sessions) in step 608. Switching between sub-chat sessions can be accomplished in various ways. For example, the process can detect Dual Tone Multifunction (DTMF) tones to indicate a particular sub-chat session. Alternatively, the participant can use a DTMF tone to be directed to an Interactive Voice Response (IVR) system to select a sub-chat session from a menu in the IVR system. In one embodiment, the participant can use voice commands to switch between the different sub-chat sessions. For example, the participant can say "switch to organizational updates chat" to switch to the organizational updates sub-chat session.

If a request to switch between sub-chat sessions has not been received in step 608, the process determines in step 614 of the chat session is over. If the chat session is over in step 614, the process ends in step 616. Otherwise, if the chat session is not over in step 614, the process goes to step 606.

If the request to switch between sub-chat sessions has been received in step 608, the process switches to the new sub-chat session in step 610. The process plays any missed text of the new sub-chat session and goes to step 614. For example, referring to FIG. 2, if Fred sent a new chat stating "yes, it will be in next week" in the project updates sub-chat session while John was listening to the organizational updates sub-chat session, when John switches to the project updates sub-chat session, the process will play a message stating that Fred stated "yes, it will be in next week." When switching between sub-chat sessions, the participant may also be provided with the ability to playback some or all of the sub-chat session.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method for managing an electronic chat session comprising:
   establishing, by a processor and via a communication network, an electronic chat session between a plurality of communication devices of a plurality of participants;
   detecting, by the processor, in the electronic chat session, a text statement that identifies an order of a plurality of topics for the electronic chat session;
   in response to detecting the text statement that identifies the order of the plurality of topics in the electronic chat session, automatically creating, by the processor, a plurality of separate electronic sub-chat sessions for the order of the plurality topics, wherein the plurality of separate electronic sub-chat sessions for the order of the plurality of topics are also between the plurality of communication devices of the plurality of participants; and
   sending, by a network interface, information associated with the plurality of separate electronic sub-chat sessions for the order of the plurality of topics to the plurality of communication devices of the plurality of participants via the communication network.

2. The method of claim 1, further comprising: attaching a document to an individual one of the plurality of separate electronic sub-chat sessions.

3. The method of claim 2, wherein the attached document can only be added by a specific participant to the individual one of the plurality of separate electronic sub-chat sessions.

4. The method of claim 1, further comprising: merging at least two or more of the plurality of separate electronic sub-chat sessions into a single sub-chat session.

5. The method of claim 4, where the at least two or more of the plurality of separate electronic sub-chat sessions are merged in a serial manner.

6. The method of claim 4, wherein the at least two or more of the plurality of separate electronic sub-chat sessions are merged based on a time of individual messages within the two or more of the plurality of separate electronic sub-chat sessions.

7. The method of claim 1, further comprising:
transferring the plurality of separate electronic sub-chat sessions to a voice device of an individual participant in the plurality of separate electronic sub-chat sessions;
converting voice into text and text into voice for the plurality of separate electronic sub-chat sessions; and
wherein the individual participant can switch between the plurality of separate electronic sub-chat sessions based on a voice command or menu selection.

8. The method of claim 1, wherein the order of the plurality of topics is based on a numeric order that is defined in the text statement.

9. The method of claim 1, wherein a first participant can selectively mute a second participant in one the plurality of separate electronic sub-chat sessions, wherein the selective muting causes the second participant to be unable to view any chat messages in the selectively muted one the plurality of separate electronic sub-chat sessions.

10. The method of claim 1, further comprising:
transferring the plurality of separate electronic sub-chat sessions to a voice device;
creating a plurality of separate voice communications to the voice device, one for each of the plurality of separate electronic sub-chat sessions; and
wherein one of the plurality of separate voice communications is active, while the rest of the plurality of separate voice communications are placed on hold.

11. A system for managing an electronic chat session comprising:
a microprocessor; and
a computer readable medium, coupled with the microprocessor and comprising microprocessor readable and executable instructions that program the microprocessor to:
establish, via a communication network, an electronic chat session between a plurality of communication devices of a plurality of participants;
detect in the electronic chat session, a text statement that identifies an order of a plurality of topics for the electronic chat session;
in response to detecting the text statement that identifies the order of the plurality of topics in the electronic chat session, automatically create a plurality of separate electronic sub-chat sessions for the order of the plurality topics, wherein the plurality of separate electronic sub-chat sessions for the order of the plurality of topics are also between the plurality of communication devices of the plurality of participants; and
send information associated with the plurality of separate electronic sub-chat sessions for the order of the plurality of topics to the plurality of communication devices of the plurality of participants via the communication network.

12. The system of claim 11, wherein the microprocessor readable and executable instructions further program the microprocessor to attach a document to an individual one of the plurality of separate electronic sub-chat sessions.

13. The system of claim 12, wherein the attached document can only be added by a specific participant to the individual one of the plurality of separate electronic sub-chat sessions.

14. The system of claim 11, wherein the microprocessor readable and executable instructions further program the microprocessor to: merge at least two or more of the plurality of separate electronic sub-chat sessions into a single sub-chat session.

15. The system of claim 14, where the at least two or more of the plurality of separate electronic sub-chat sessions are merged in a serial manner.

16. The system of claim 14, wherein the at least two or more of the plurality of separate electronic sub-chat sessions are merged based on a time of individual messages within the two or more of the plurality of separate electronic sub-chat sessions.

17. The system of claim 11, wherein the microprocessor readable and executable instructions further program the microprocessor to:
transfer the plurality of separate electronic sub-chat sessions to a voice device of an individual participant in the plurality of separate electronic sub-chat sessions;
convert voice into text and text into voice for the plurality of separate electronic sub-chat sessions; and
wherein the individual participant can switch between the plurality of separate electronic sub-chat sessions based on a voice command or menu selection.

18. The system of claim 11, wherein the order of the plurality of topics is based on a numeric order that is defined in the text statement.

19. The system of claim 11, wherein a first participant can selectively mute a second participant in one the plurality of separate electronic sub-chat sessions, wherein the selective muting causes the second participant to be unable to view any chat messages in the selectively muted one the plurality of separate electronic sub-chat sessions.

20. The system of claim 11, and wherein the microprocessor readable and executable instructions further program the microprocessor to:
transfer the plurality of separate electronic sub-chat sessions to a voice device;
create a plurality of separate voice communications to the voice device, one for each of the plurality of separate electronic sub-chat sessions; and
wherein one of the plurality of separate voice communications is active, while the rest of the plurality of separate voice communications are placed on hold.

* * * * *